(12) United States Patent
Engler

(10) Patent No.: US 7,316,376 B1
(45) Date of Patent: Jan. 8, 2008

(54) APPARATUS FOR PIVOTABLY MOUNTING AN ELECTRICAL ENCLOSURE

(76) Inventor: John C. Engler, 2914 Talmadge Rd., Toledo, OH (US) 43606

(*) Notice: Subject to any disclaimer, the term of this patent is extended or adjusted under 35 U.S.C. 154(b) by 170 days.

(21) Appl. No.: 10/922,294

(22) Filed: Aug. 19, 2004

Related U.S. Application Data

(60) Provisional application No. 60/497,251, filed on Aug. 21, 2003.

(51) Int. Cl.
*E04G 5/06* (2006.01)
(52) U.S. Cl. .............................. 248/218.4; 248/274.1; 248/548; 361/652
(58) Field of Classification Search ............. 248/274.1, 248/218.4, 219.3, 219.4, 548; 362/43; 361/652
See application file for complete search history.

(56) References Cited

U.S. PATENT DOCUMENTS

| | | | | |
|---|---|---|---|---|
| 4,101,191 | A | * | 7/1978 | Gould et al. ................ 439/131 |
| 4,142,173 | A | * | 2/1979 | Gould et al. ................ 340/944 |
| 4,369,429 | A | * | 1/1983 | Souder ........................ 362/391 |
| 4,371,743 | A | | 2/1983 | Decker |
| 4,500,944 | A | | 2/1985 | Roberts et al. |
| 4,530,032 | A | | 7/1985 | Perry, II |
| 4,659,046 | A | * | 4/1987 | Parduhn .................. 248/230.9 |
| 4,917,338 | A | * | 4/1990 | Olson et al. ........... 248/229.17 |
| 5,165,644 | A | * | 11/1992 | Allen ....................... 248/285.1 |
| 5,340,069 | A | * | 8/1994 | Niemeyer .................... 248/214 |
| 5,452,951 | A | | 9/1995 | Peller |
| 5,567,913 | A | | 10/1996 | Lin |
| 5,587,874 | A | * | 12/1996 | Hoppensteadt et al. ..... 361/663 |
| 5,777,843 | A | | 7/1998 | Younce |
| 5,886,868 | A | * | 3/1999 | White et al. ................ 361/652 |
| 5,964,444 | A | * | 10/1999 | Guertler ..................... 248/548 |
| 6,007,353 | A | | 12/1999 | Webster |
| 6,218,615 | B1 | | 4/2001 | Canonico |
| 6,398,392 | B2 | | 6/2002 | Gordin et al. |
| 6,648,678 | B1 | | 11/2003 | Kaneko |
| 6,969,034 | B2 | * | 11/2005 | Ware et al. .............. 248/218.4 |

* cited by examiner

*Primary Examiner*—Anita M. King
(74) *Attorney, Agent, or Firm*—MacMillan, Sobanski & Todd, LLC

(57) ABSTRACT

A combined mounting apparatus and electrical enclosure assembly that is adapted to be supported on a support surface includes a frame member that is adapted to be supported on the support surface. A mounting bracket is provided that is connected to the frame member. The mounting bracket includes an arm having an opening. An electrical enclosure is provided that is adapted to enclose an electrical component including a wire. The electrical enclosure has an opening formed therethrough. The electrical enclosure is supported on the frame member for pivoting movement about an axis defined by the opening of the mounting bracket and the opening of the electrical enclosure. The opening of the mounting bracket and the opening of the electrical enclosure form a passageway that is adapted to allow the passage of the wire therethrough.

16 Claims, 7 Drawing Sheets

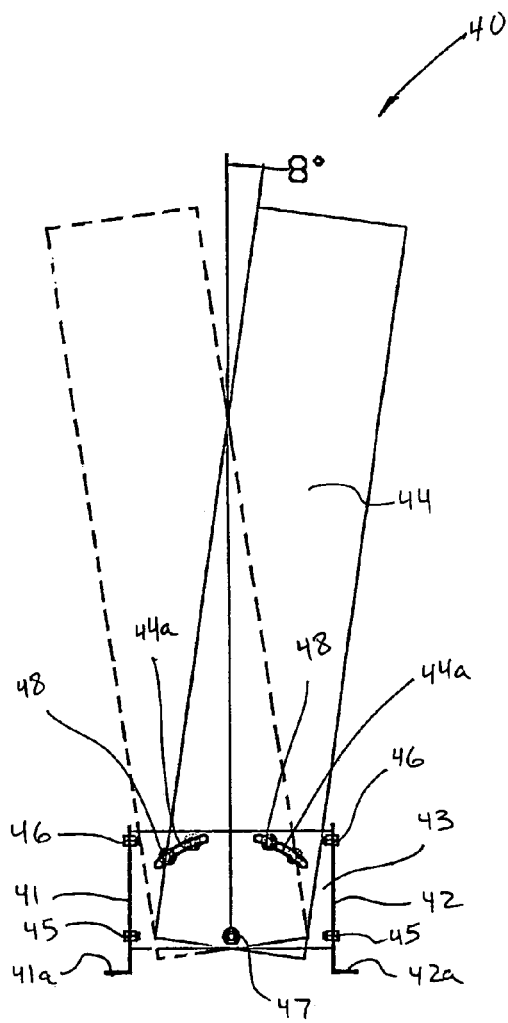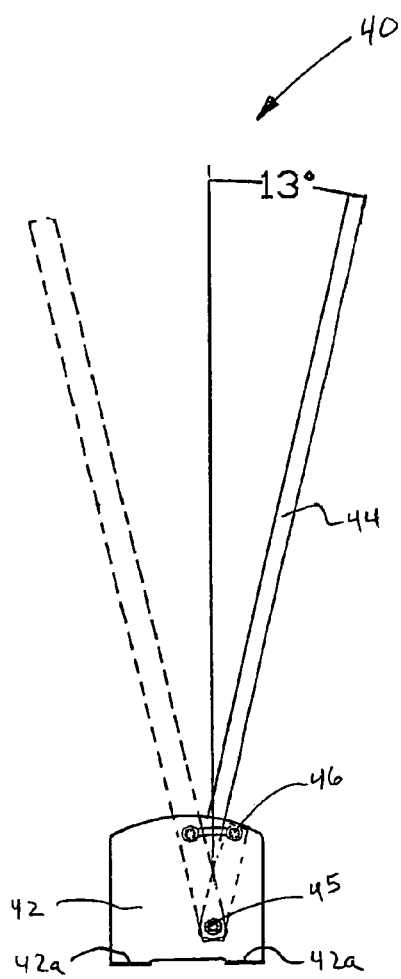
FIG. 7
FIG. 8

APPARATUS FOR PIVOTABLY MOUNTING AN ELECTRICAL ENCLOSURE

CROSS-REFERENCE TO RELATED APPLICATIONS

This application claims the benefit of U.S. Provisional Application No. 60/497,251, filed Aug. 21, 2003, the disclosure of which is incorporated herein by reference.

BACKGROUND OF THE INVENTION

This invention relates in general to enclosures for electrical components. In particular, this invention relates to an apparatus for pivotably mounting such an electrical enclosure on a wall or other support surface.

A variety of enclosures are known in the art for protectively enclosing one or more electrical components, such as switches, circuit breakers, and the like. Such electrical enclosures are designed to protect the enclosed electrical components from unauthorized access and from external environmental conditions. A variety of standards have been promulgated for such electrical enclosures that specify their design, construction, materials, and resulting level of protection that can be expected therefrom. Some of such standards prohibit the formation of any openings through the walls of such electrical enclosures because penetration through any of these walls could reduce the level of protection that is provided thereby. Examples of such electrical enclosure standards include NEMA (National Electrical Manufacturers Association) standard types 4, 4x, and 12.

Electrical enclosures may be used to contain main control components, operator interface controls, or other devices that may need to be located on or near machinery in an industrial facility. Such electrical enclosures are usually located in close proximity to the related machinery, but should not prevent access to the machinery.

There are various systems in use today that use a group of components to allow motion of the enclosure relative to a stationary support surface. However, these systems are usually intended for use with operator interface enclosures. Some machine tool manufacturers have devised their own means of pivoting an enclosure, but these means are usually designed for a specific application and require machining, welding, or a modified enclosure to facilitate the installation. Large hinges have been used to hang boxes where the wiring was installed in flexible conduits, but, over time, the conduits can become broken due to fatigue or abuse, thus compromising the integrity of the wiring, as well as posing a safety concern. Thus, it would be desirable to provide an apparatus for pivotably mounting such an electrical enclosure on or near machinery such that the electrical enclosure can be pivoted to access to the related machinery behind the enclosure without damage or disconnection of the components contained within the electrical enclosure.

SUMMARY OF THE INVENTION

This invention relates to a combined mounting apparatus and electrical enclosure assembly that is adapted to be supported on a support surface. The combined mounting apparatus and electrical enclosure assembly includes a frame member that is adapted to be supported on the support surface. A mounting bracket is provided that is connected to the frame member. The mounting bracket includes an arm having an opening. An electrical enclosure is provided that is adapted to enclose an electrical component including a wire. The electrical enclosure has an opening formed therethrough. The electrical enclosure is supported on the frame member for pivoting movement about an axis defined by the opening of the mounting bracket and the opening of the electrical enclosure. The opening of the mounting bracket and the opening of the electrical enclosure form a passageway that is adapted to allow the passage of the wire therethrough.

An electrical enclosure containing main control components, operator interface controls, or other needed devices, is mounted on a pivoting axis to provide accessibility to machinery. The invention allows the wiring to enter and exit the enclosure with a minimum of disturbance. The invention allows two separate and unrelated systems to be joined into an integrated unit. The first system consists of boxes used to house electrical components in industrial settings and on individual machines. These are most commonly referred to as "enclosures". The second system consists of a variety of styles of unitized framing components that are made of steel or aluminum.

Machinery of increasing complexity, as well as industry demands to minimize the footprint of equipment, create difficult decisions as to where to locate electrical enclosures. Physical access to various components of equipment for maintenance or repair should not be restricted. By utilizing this invention, it becomes possible to facilitate the movement of enclosures of various sizes around a vertical axis, thereby providing for needed access normally blocked by a conventional, rigid installation. Use of the invention also allows for standard, off the shelf enclosures to be installed in a variety of applications using only common tools and methods of the electrical industry.

A principle advantage of the invention is the ease in which a professional looking installation is achieved in a variety of applications without having the assets of a fabrication or machine shop available. The invention allows the pivoting feature to be employed with different framing technologies, thus meeting the demands of a more diverse group of industries. Depending upon the size of the framing members used and the geometry of the frame assembly, the invention is able to support enclosures ranging in size from small operator interfaces to large main enclosures weighing in excess of one thousand pounds.

The invention provides an assembly for attaching commonly used conduit or wireway systems. Wiring entering and exiting the enclosures should be installed in an approved manner to comply with electrical codes and the invention can be configured to accept any conduit or wireway system. The design of the system eliminates the need for flexible conduits, which are often subject to damage, to achieve the movement of the enclosure and also protects the wiring from abuse.

One embodiment of the invention consists of an upper mounting bracket, a lower mounting bracket, a hub/sleeve, a bearing and spacer assembly, and a reinforcing base plate with locking mechanism. A bolt secures the enclosure to the lower bracket. The latching mechanism secures the enclosure in a home position. Provisions can be made to provide additional locked positions, if needed, by simple modifications to the reinforcing base plate.

The upper and lower mounting brackets may be machined from a solid block of material or can be weldments or castings. Attachment holes are provided at locations that will allow mounting on a number of standardized framing systems. The positions in which they are mounted are determined by the enclosure to be installed. Installation is accomplished using hand tools and provided hardware.

The internal flanged hub is fastened to the enclosure through an opening created with common tools and methods of the electrical industry. The reinforcing base plate and axis bolt are also installed in the same manner.

Various objects and advantages of this invention will become apparent to those skilled in the art from the following detailed description of the preferred embodiments when read in light of the accompanying drawings.

BRIEF DESCRIPTION OF THE DRAWINGS

FIG. 7 is a front elevational view similar to FIG. 5 showing a first range of movement of the mounting apparatus.

FIG. 8 is a side elevational view similar to FIG. 6 showing a second range of movement of the mounting apparatus.

DETAILED DESCRIPTION OF THE PREFERRED EMBODIMENTS

Figure 1:
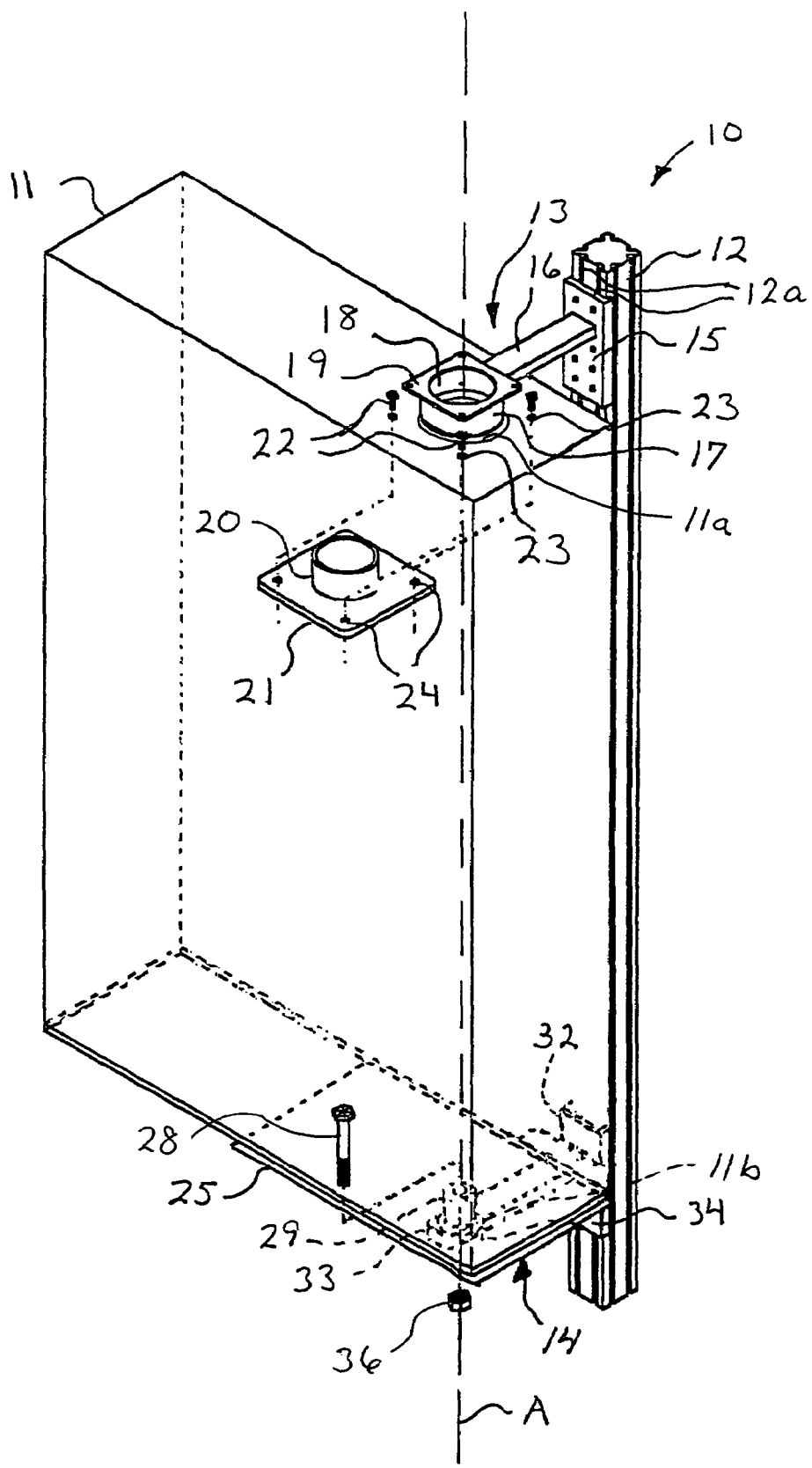
FIG. 1 is a perspective view of a first embodiment of a combined mounting apparatus and electrical enclosure assembly in accordance with this invention.

Referring now to the drawings, there is illustrated in FIG. 1 a first embodiment of a combined mounting apparatus and electrical enclosure assembly in accordance with this invention. The combined mounting apparatus and electrical enclosure assembly includes a mounting apparatus, indicated generally at 10, that is provided to facilitate the mounting of an electrical enclosure 11, to a support surface (not shown), such as a wall or a portion of a machine (not shown). The electrical enclosure 11 is supported on the mounting apparatus 10 such that the electrical enclosure 11 may pivot about an axis A, as will be described below. Although the mounting apparatus 10 will be described and illustrated in the context of pivotably supporting the electrical enclosure 11, it will be appreciated that the mounting apparatus 10 may be used to pivotably support other objects.

The mounting apparatus 10 includes a framing member 12, a top mounting bracket assembly, indicated generally at 13, and a bottom mounting bracket assembly, indicated generally at 14. The illustrated framing member 12 includes at least one ridge or groove 12a (two are shown in the illustrated embodiment) to facilitate alignment and mounting of the top and bottom mounting bracket assemblies 13, 14 relative to the framing member 12, although such is not required. It will be appreciated that the framing member 12 may be formed integral to the piece of machinery or wall on which the electrical enclosure 11 is to be mounted. It will also be appreciated that the frame member 12 may be part of or be designed to cooperate with any conventional framing system.

The top mounting bracket assembly 13 includes a mounting plate 15 that is connected to the framing member 12. The mounting plate 15 may include a pair of flange portions that wrap around a portion of the framing member 12, although such is not required. An upper arm 16 extends from the top mounting plate 15 and includes a collar 17 having an opening 18 formed therethrough. The center of the opening 18 of the top mounting bracket 13 is intersected by the vertical axis A about which the electrical enclosure 11 will pivot. The end of the upper arm 16 terminates in a wireway flange 19. The wireway flange 19 is a generally square shaped structure that is adapted to cooperate with a conventional wiring system (not shown) in a manner that is well known in the art to allow incoming and exiting wires (not shown) to pass from inside of the electrical enclosure 11 to outside the electrical enclosure 11. To accomplish this, the wireway flange 19 is preferably sized to communicably connect to standard wireway flanges provided on wireway systems commonly used in industry. Although the wireway flange 19 is illustrated as a generally square or rectangular flange having four mounting apertures formed therethrough, it will be appreciated that the wireway flange 19 may be any shape with any configuration or number of mounting apertures. A conventional adapter (not shown), which can attach to the flange 19, can allow the attachment of conduits or any other desired means to form a passageway for wiring through the electrical enclosure 11.

The electrical enclosure 11 has an upper opening 11a formed therethrough, and, preferably, a sleeve 20 extends through the upper opening 11a. The sleeve 20 includes a flange portion 21 that facilitates the connection of the sleeve 20 to the inside of the electrical enclosure 11 by a plurality of bolts 22. The bolts 22 extend through respective openings 23 formed through the electrical enclosure 11 and through respective openings 24 formed through the flange portion 21. When fastened to the electrical enclosure, the sleeve 20 extends through the upper opening 11a formed through the electrical enclosure into the opening 18 formed through the collar 17. Thus, the sleeve 20 forms a passageway that allows wiring (not shown) to pass through from a wireway system (not shown) connected to the wireway flange 19 into the electrical enclosure 11. Alternatively, the sleeve 20 may include a hub (not shown) similar to those used by conventional conduit systems that attach by a threaded shank and locknut (not shown). Such a hub may be sealed against outside contaminants by an O-ring, gasket, sealant, or other means (not shown). The edges of the hub may be smooth so as not to abrade the wire insulation. It will further be appreciated that the invention may be practiced without the sleeve 20 and that the upper opening 11a and the opening 18 may cooperate to form a passageway to allow wiring (not shown) to pass through from a wireway system (not shown) exterior to the combined mounting apparatus and electrical enclosure assembly into the electrical enclosure 11.

The opening 18 formed through the collar 17 is sized to receive the sleeve 20 therein so as to allow the electrical enclosure 11 to pivot relative to the collar 17 and the remainder of the upper mounting bracket assembly 13. The collar 17 and sleeve 20 are thus preferably sized to allow free relative movement therebetween. While it is not needed in most applications, the collar 17 can be designed to include a bushing, a bearing assembly, and/or a seal if desired.

Figure 2:
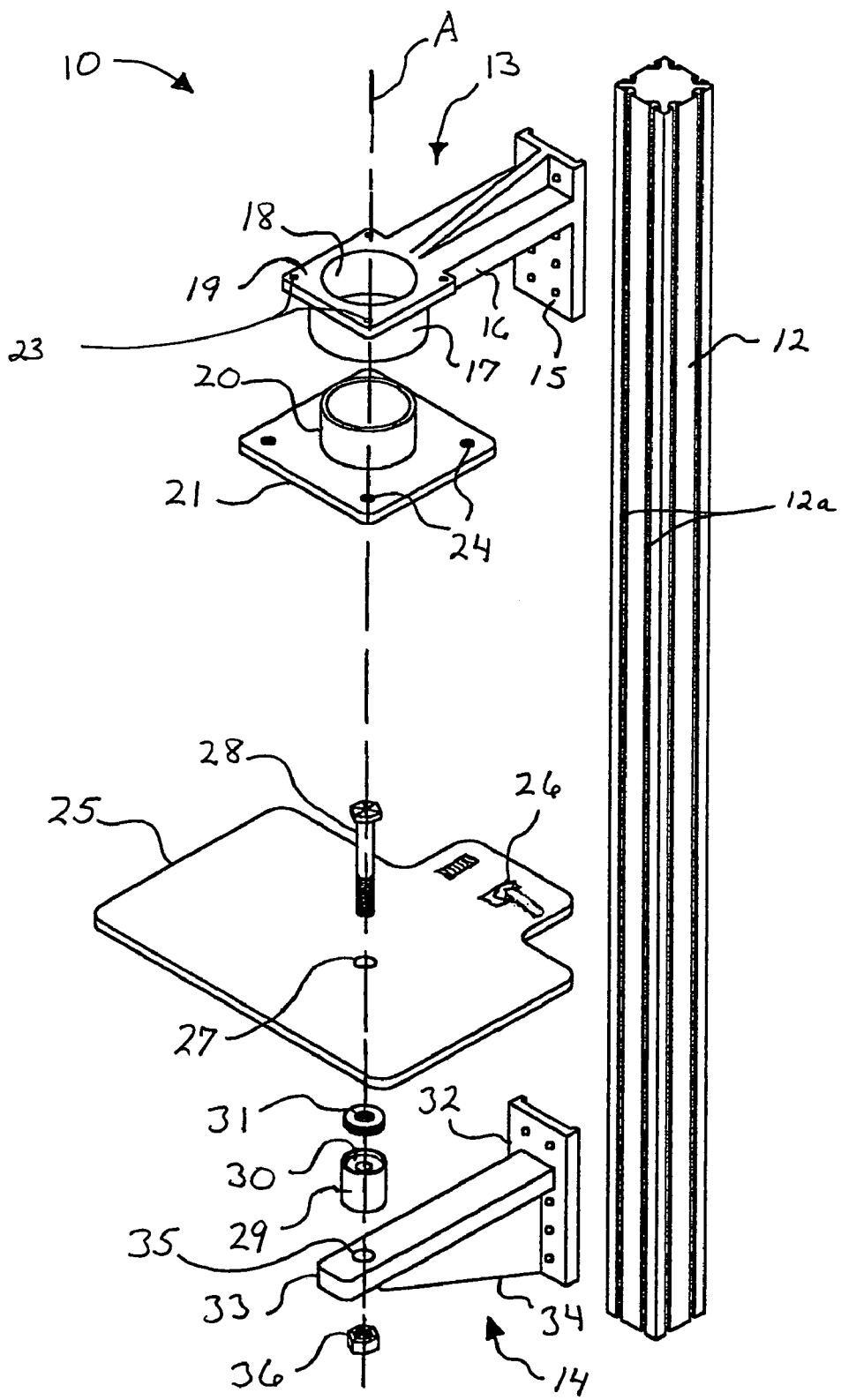
FIG. 2 is an exploded perspective view of the first embodiment of the mounting apparatus portion of the combined mounting apparatus and electrical enclosure assembly illustrated in FIG. 1.

A reinforcing base plate 25 is mounted to the bottom of the outside of the electrical enclosure 11, although such is not required. The illustrated base plate 25 may be provided to distribute the weight of the electrical enclosure 11 and the weight of the components (not shown) within the enclosure 11 from the axis A to the outer edges of the electrical enclosure 11, where the electrical enclosure 11 is more rigid. Therefore, it will be appreciated that the base plate 25 may extend over the entire bottom surface of the electrical enclosure 11 or any portion thereof. As best shown in FIG. 2, the base plate 25 may include a conventional locking mechanism 26 for selectively preventing unwanted pivoting movement of the electrical enclosure 11 relative to the mounting apparatus 10. The locking mechanism 26 may also lock the electrical enclosure 11 in a home position or various other positions relative to the mounting apparatus 10, as will be described below. In a preferred embodiment, the base plate 25 is fastened to the electrical enclosure 11 with a minimum of two screws (not shown). The base plate 25 includes a hole 27 that allows a pivot member 28, such as a threaded fastener or bolt, to pass therethrough. The pivot member 28 passes through a lower opening 11b formed through the bottom of the electrical enclosure 11 such that the electrical enclosure 11 is connected to the base plate 25. The center of the hole 27 is intersected by the axis A for rotation of the electrical enclosure 11.

As best shown in FIG. 2, a spacer 29 is located between the reinforcing base plate 25 and the lower mounting bracket assembly 14. The spacer 29 takes up the space needed for installation of the electrical enclosure 11 between the upper and lower mounting bracket assemblies 13, 14. The spacer 29 may also include an alignment portion 30 to serve as a locator for a bearing device 31 that is provided to reduce the amount of friction when the electrical enclosure 11 is pivoted relative to the mounting apparatus 10 in the manner described below. Although the force required to pivot an electrical enclosure 11 of relatively small size may not be problematic, the electrical enclosure 11 may be relatively large in size, containing enclosures with heavy components that can weigh hundreds of pounds. In these instances, the force required to pivot the electrical enclosure 11 can be cumbersome. The bearing device 31 can be embodied as a thrust washer, a ball or tapered roller bearing assembly, or any other conventional bearing device.

The lower mounting bracket 14 includes a mounting plate 32 and a lower arm 33. The lower mounting bracket assembly 14 is attached to the framing member 12 in the same manner as described for the upper mounting bracket 13. The distance between the upper and lower mounting bracket assemblies 13, 14 when mounted to the framing member 12 is determined by the size of the electrical enclosure 11 to be mounted and the clearance required to mount the electrical enclosure 11 within the mounting apparatus 10. The lower mounting bracket 14 carries the bulk of the weight of the electrical enclosure 11, and an optional bracing member 34 may be provided for the lower arm 33 of the lower mounting bracket 14. The bracing member 34 and the lower arm 33 may be sized according to the application of the mounting apparatus 10, for example, in relation to the size of the electrical enclosure 11 and/or the components to be housed within the electrical enclosure 11. A hole 35 is formed through the lower arm 33 of the lower mounting bracket 14 such that the center of the hole 35 is aligned on the axis A. After the pivot member 28 is threaded through the opening in the bottom of the electrical enclosure 11 and the base plate 25, the pivot member 28 is fed through the bearing device 31, the spacer assembly 29, and the hole 35 in the lower arm 33 to form the lower vertical pivoting point on the axis A for the bottom of the electrical enclosure 11. The pivot member 28 can be secured in a tapped hole or with an optional nut 36.

In an alternate embodiment, the lower mounting bracket 14 may also be configured to not only support the weight of the electrical enclosure 11 and permit pivotable movement, but also to allow the mounting of a wireway to facilitate wiring to exit through the lower pivot point as well as the top. This may be achieved by incorporating a collar and sleeve system, similar to that described for the upper mounting bracket assembly 13, in the lower mounting bracket assembly. The alternate lower mounting bracket assembly could incorporate a thrust bearing or similar device that would allow the wiring to pass through the lower pivot point. A means to adapt a wireway or conduit system may also be included in this alternate version of the lower mounting bracket assembly.

The size of the upper and lower mounting bracket assemblies 13, 14 should be determined not only by the size of the electrical enclosure 11, but also the number, size, and type of conductors that are entering, exiting, or housed within the electrical enclosure 11. The National Electric Code (NEC), published by the National Fire Protection Association, limits the conductor fill in metallic wireways to twenty percent of their cross-sectional area. This should also be taken into consideration in determining the size and design of the upper and lower mounting bracket assemblies 13, 14. The size of collar 17 and sleeve 20 of the upper mounting bracket assembly 13 may be sized to provide the needed cross-sectional area demanded by the corresponding size of wireway. It will be appreciated that the invention may be practiced without the lower mounting bracket assembly 14. It will further be appreciated that the invention may be practiced with any number or configuration of assemblies similar to the upper mounting bracket assembly 13. It will also be appreciated that the terms "upper" and "lower" are used herein for ease in reference to the illustrated embodiment only and are not intended to limit the scope of the invention.

If the invention is to be practiced with an electrical enclosure 11 requiring large supply conductors, a type of cable that allows the electrical enclosure 11 to flex freely should be used to accommodate the pivoting action of the electrical enclosure 11. In an alternate embodiment, a flexible wireway fitting could be disposed within the sleeve 20 that is anchored to the upper mounting bracket assembly 13 and connected to the external wiring system (not shown).

In a preferred embodiment, the mounting apparatus 10 may be designed of standard framing and bracket systems currently in use in industry. The mounting apparatus 10 may be designed and sized to mount conventional or standard electrical enclosures currently in use in industry, although such is not required. The mounting apparatus 10 can be adapted such that the frame member 12 functions with or is integral to multiple conventional framing systems. At least a portion of the mounting apparatus 10 can be adapted to function with structural steel tubing, and may be constructed of castings, weldments, or a combination thereof. At least a portion of the mounting apparatus 10 can be constructed of steel or aluminum, but it will be appreciated that other materials may also be used.

The preferred procedure for mounting the electrical enclosure 11 to the mounting apparatus 10 will now be explained. Standard tools used in the electrical industry are all that are needed to modify the enclosure and complete the installation. The tools needed for mounting are: drill motor and bits;

center punch; knockout set; folding rule or tape measure; jig saw (not required for all installations); and wrenches.

First, an electrician determines the height at which the electrical enclosure 11 is to be mounted. The upper and lower mounting bracket assemblies 13, 14 are attached to the frame member 12. The distance between the upper and lower mounting bracket assemblies 13, 14 is determined by the size of the electrical enclosure 11. Threaded fasteners (not shown) are inserted through openings in the mounting bracket assemblies 13, 14 and may connect to standard hardware used with the particular frame system for the frame member 12.

Next, the electrician, using a template or typical layout tools, locates mounting screw holes 23 and an upper opening 11*a* for the sleeve 20 to pass through in the top of the electrical enclosure 11. The first opening 11*a* for the sleeve 20 can be cut with a jigsaw or similar device or a conduit knockout set if the sleeve 20 is the appropriate size. Mounting holes 23 are made with a typical drill motor and bit.

The electrical enclosure 11 is then turned upside down and a corresponding lower opening 11*b* on the same centerline of the axis A is punched, preferably with a ½" conduit knockout. Mounting holes (not shown) are also drilled to fasten the reinforcing base plate 25 to the bottom of the electrical enclosure 11. The electrical enclosure 11 is then righted, and the reinforcing base plate 25 is fastened to the underside of the electrical enclosure 11. It will be appreciated that the enclosure manufacturer may pre-cut the required upper and lower openings 11*a*, 11*b* through the electrical enclosure 11 to specification during the fabrication process of the electrical enclosure 11.

A ring of sealant or a gasket (not shown) may be next applied to the top of the mounting flange 21 of the sleeve 20, although such is not required. The sleeve 20 is inserted up through the upper opening 11*a* in the top of the electrical enclosure 11 from the inside and is fastened in place by threaded fasteners 22, preferably from outside of the electrical enclosure 11. A small amount of lubricant may be applied to the protruding sleeve 20.

The electrical enclosure 11 is now lifted so as to insert the sleeve 20 into the collar 17 of the upper mounting bracket 13. The bearing 31 and spacer assembly 29 is now placed under the electrical enclosure 11, between the reinforcing base plate 25 and the lower mounting bracket 14. A long threaded fastener 28 is now inserted, preferably from the inside of the electrical enclosure 11, through the lower opening 11*b*, the reinforcing base plate 25, the bearing 31, the spacer assembly 29, and the lower mounting bracket 14.

The electrical enclosure 11 is now free to pivot about the axis A. The locking mechanism 26 is mounted on the reinforcing base plate 25 to latch the electrical enclosure 11 in a home position, as will be described below. Additional clamps or locking mechanisms (not shown) could also now be installed if it were desirable to hold the electrical enclosure 11 in more than one position. The desired conduit or wireway (not shown) may now be connected to the wireway flange 19, and the electrical enclosure 11 is ready to accept wiring.

Figure 3:
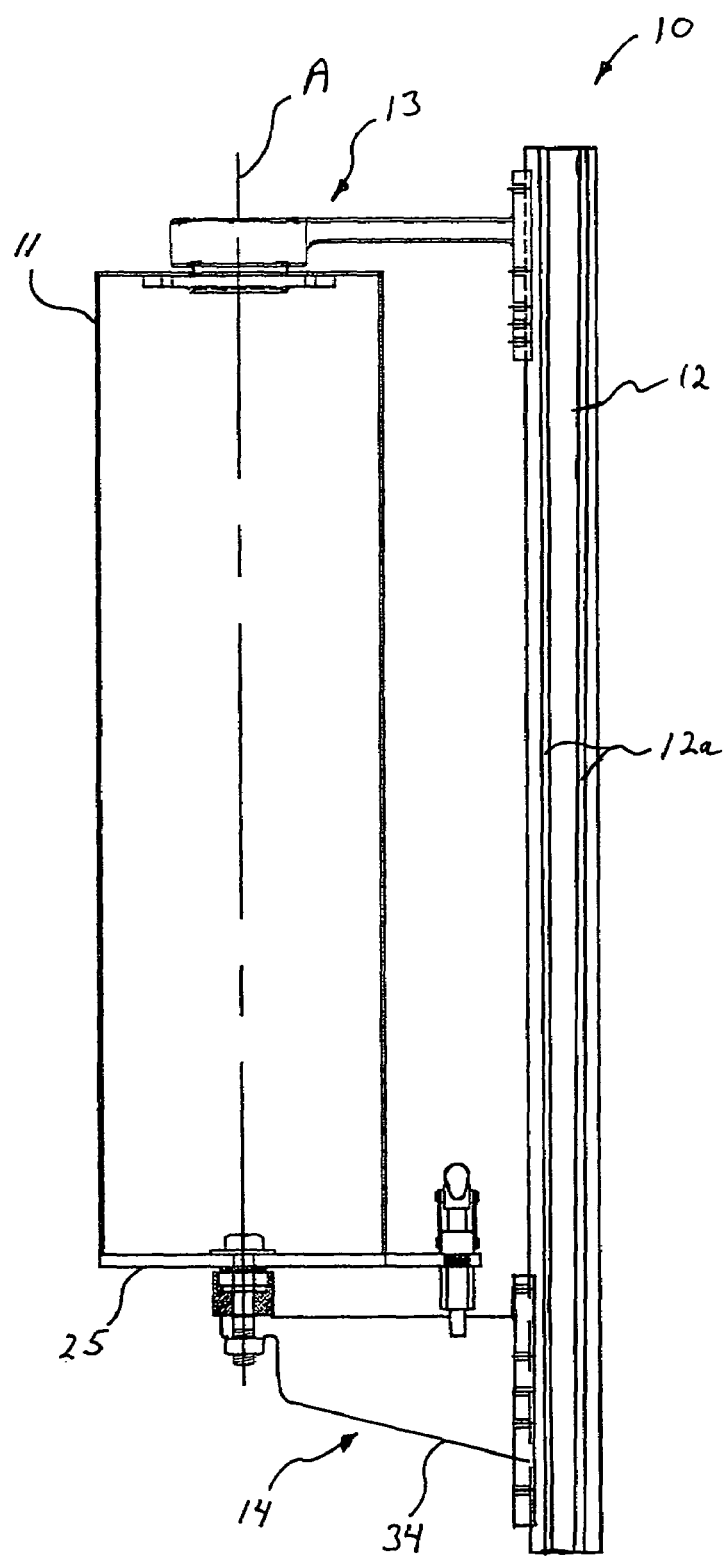
FIG. 3 is a side elevational view of the first embodiment of the combined mounting apparatus and electrical enclosure assembly illustrated in FIG. 1.
Figure 4:
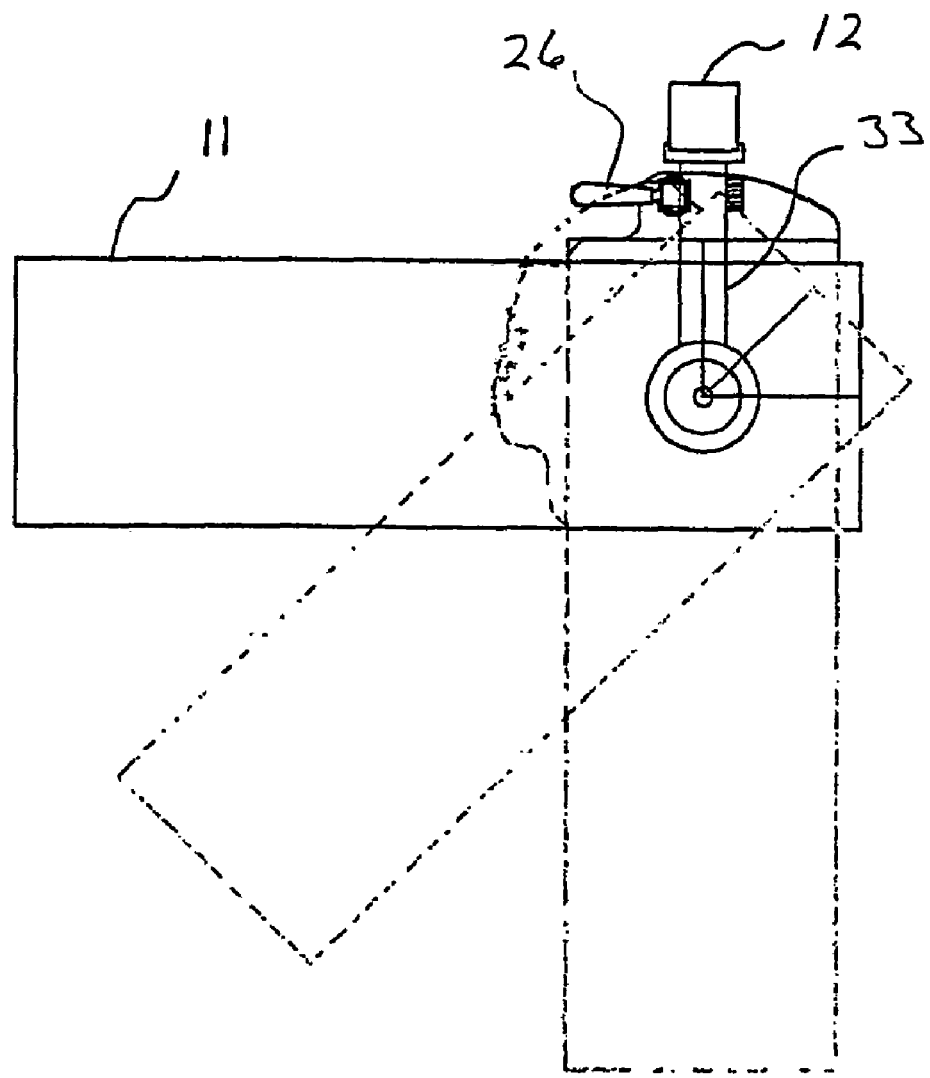
FIG. 4 is a top plan view of the first embodiment of the combined mounting apparatus and electrical enclosure assembly illustrated in FIGS. 1 and 3.

Referring now to FIGS. 3 and 4, there is illustrated the first embodiment of the combined mounting apparatus and electrical enclosure assembly shown with the electrical enclosure 11 in the home position relative to the mounting apparatus 10, as illustrated in FIGS. 1 and 2. In a preferred embodiment, the electrical enclosure 11 is in the home position relative to the mounting apparatus 10 when the opening side of electrical enclosure 11 extends perpendicular to arms 16, 33 of the upper and lower mounting bracket assemblies 13, 14. In the home position, the back of the electrical enclosure 11 is preferably mounted flush against the support surface (not shown). Preferably, the locking mechanism 26 cooperates with the lower mounting bracket assembly 14 to lock the electrical enclosure 11 to the mounting apparatus 10 in the home position. Alternatively, the locking mechanism 26, or additional clamps or locking mechanisms may be provided to lock the electrical enclosure 11 in various other positions relative to the mounting apparatus 10. This may be desired to facilitate access to the electrical enclosure 11, or the support surface behind the electrical enclosure 11. Two alternative positions for the electrical enclosure 11 and attached base plate 25, relative to the mounting apparatus 10, are illustrated in shadow in FIG. 4. In a preferred embodiment, the electrical enclosure 11 is pivotable over a range of ninety degrees from the home position such that the electrical enclosure 11 may be pivoted until the opening side of the electrical enclosure 11 extends parallel to the arms 16, 33 of the upper and lower mounting bracket assemblies 13, 14.

Figures 5, 6:
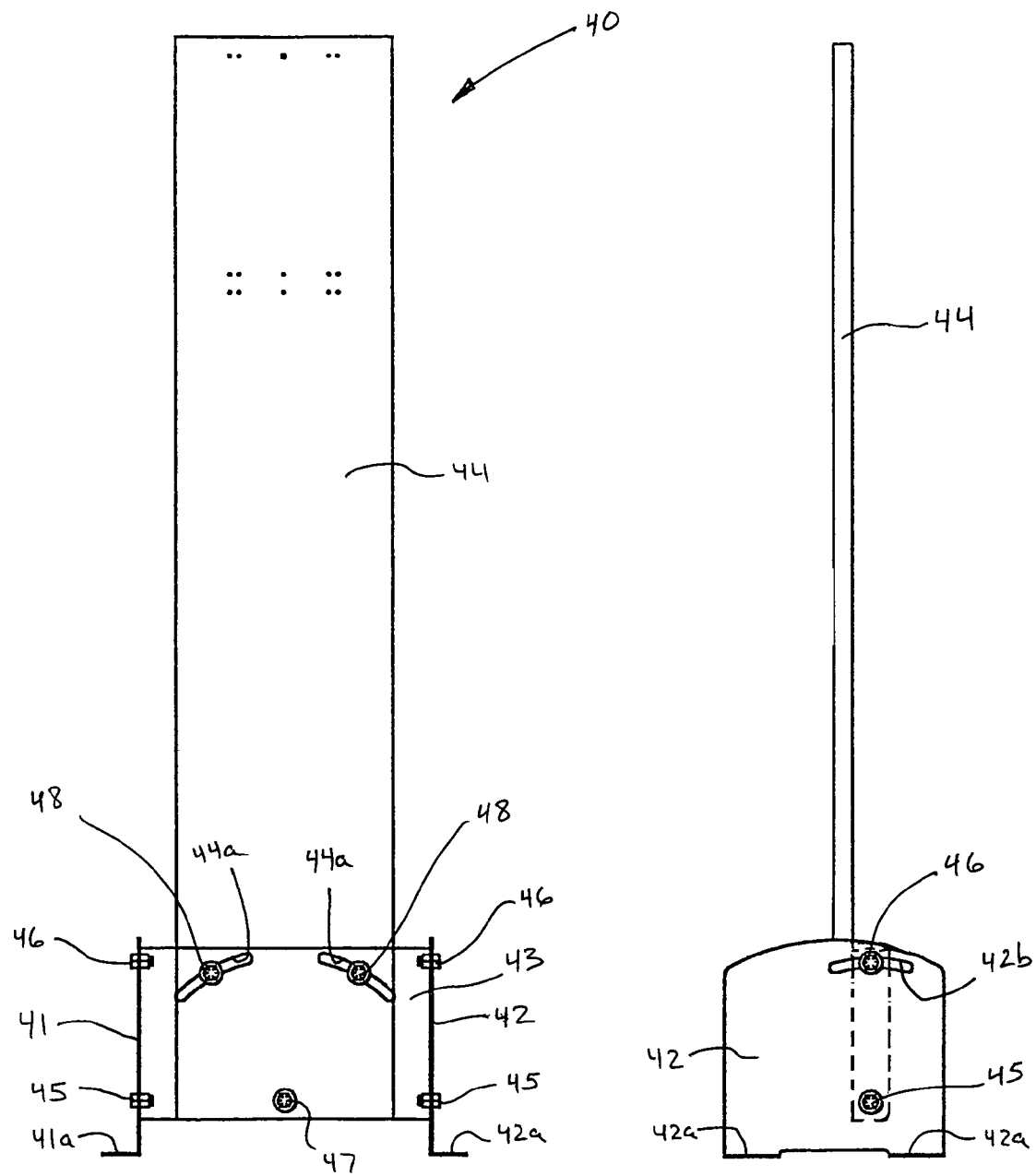
FIG. 5 is a front elevational view of a second embodiment of a mounting apparatus for an electrical enclosure in accordance with this invention.
FIG. 6 is a side elevational view of the second embodiment of the mounting apparatus for the electrical enclosure illustrated in FIG. 5.

Referring now to FIGS. 5 through 8, there is illustrated a second embodiment of a mounting apparatus, indicated generally at 40, in accordance with this invention. The mounting apparatus 40 includes a pair of base plates 41 and 42 having a backing plate 43 extending therebetween and an upright 44 extending upwardly therefrom. The illustrated base plates 41 and 42 are generally L-shaped, including respective base flanges 41*a* and 42*a* that are adapted to be secured to a floor (not shown) or other support surface by any conventional means. The backing plate 43 is supported on the base plates 41 and 42 so as to be pivotable relative thereto in a first direction of movement (forward and rearward, for example). To accomplish this, the opposite sides of the lower end of the backing plate 43 are pivotably secured to the base plates 41 and 42 by respective fasteners 45. Each of the base plates 41 and 42 has an arcuate slot formed therethrough (only the arcuate slot 42*b* is illustrated in FIGS. 6 and 8). The opposite sides of the upper end of the backing plate 43 are slidably connected to the base plates 41 and 42 by respective fasteners 46 that extend through the arcuate slots 42*b*. Thus, the backing plate 43 is supported on the base plates 41 and 42 so as to be pivotable in the first direction of movement.

The upright 44 is supported on the backing plate 43 so as to be pivotable relative thereto in a second direction of movement (side to side, for example). To accomplish this, the lower end of the upright 44 is pivotably secured to the backing plate 43 by a fastener 47. The upright 44 has a pair of arcuate slots 44*a* formed therethrough. The upright 44 is slidably connected to the backing plate 43 by respective fasteners 48 that extend through the arcuate slots 44*a*. Thus, the upright 44 is supported on the backing plate 43 so as to be pivotable relative thereto in a second direction of movement. The electrical enclosure 11 described above can be mounted on the upper end of the upright 44 in any conventional manner. By appropriately positioning the backing plate 43 relative to the base plates 41 and 42 and by appropriate positioning the upright 44 relative to the backing plate 43 (as shown in FIGS. 7 and 8), the electrical enclosure 11 can supported on the floor or other support surface in any desired position.

This freestanding mounting apparatus 40 was designed to provide a means of mounting safety disconnect switches in locations where a mounting surface such as a wall or column is not close to the electrical installation. In large manufacturing facilities with broad open floor spaces, equipment is arranged where needed and conduits carrying supply wiring are dropped down from the ceiling. A disconnect switch is often used to provide a safe means of de-energizing the equipment at the floor level and can be required by the National Electrical Code (NEC) in certain conditions. Prior art in this application has been to use whatever material and design that the individual given the task has available, leading to a variety of heights, shapes, and quality. The labor for building these brackets one at a time as needed is expensive. This invention would take advantage of mass-production technologies and eliminate the extra labor. All that is needed is removing the four components from a box, bolt them together, anchor it to the floor, and plumb the riser. The design allows for the compensation of uneven floors through the use of slots where the components are bolted to each other. An optional feature that can be included is the pre-drilling of mounting holes for commonly used safety disconnects. A uniform installation of manufactured quality is achieved with a lower labor cost.

Figure 9:
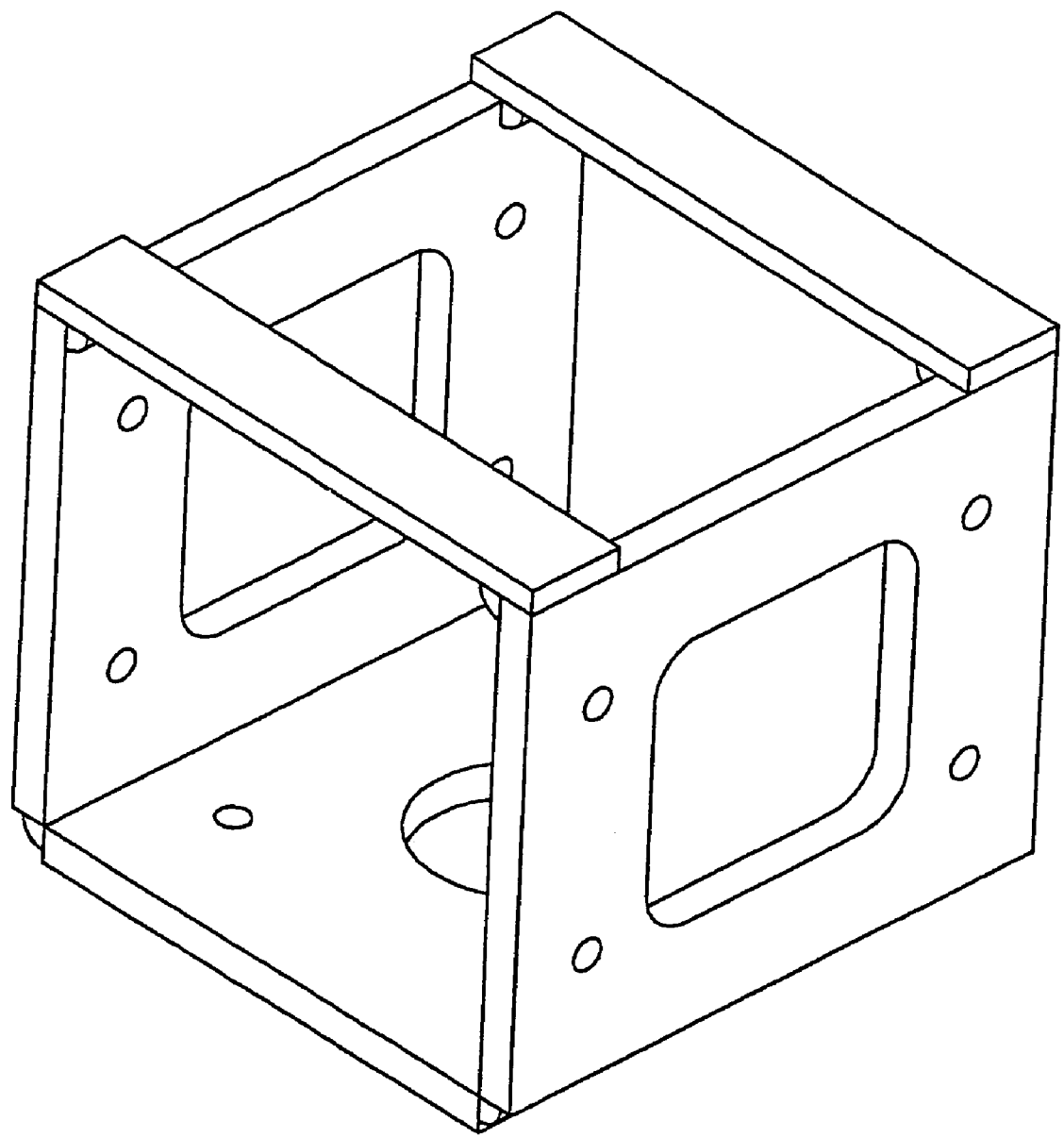
FIG. 9 is a top view of a framing member in accordance with this invention.

Referring now to FIG. 9, there is illustrated an alternate framing member comprising a pendant brace, in accordance with the present invention. The pendant brace is a device that is installed inside of the wireway systems commonly used to enclose wiring on industrial equipment. It is meant to allow wiring to pass through the brace itself while providing a means of mounting commonly used hardware for the installation of operator interface pendant stations. Pendant mounted operator interface stations are often used to control machine tools and other manufacturing processes. The techniques used to install these pendant arms are often unique to the individual machine and must provide a structural support as well as a path for the control wiring. A feature of the pendant brace is to provide a greater number of options for mounting pendants as the wireway systems can be quite extensive. The brace has mounting holes to accept pendant system components and provides a location for a wireway support. It also adds structural rigidity to the wireway. The result is an unobtrusive installation with a greater number of mounting locations.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A combined mounting apparatus and electrical enclosure assembly that is adapted to be supported on a support surface comprising:
    a frame member that is adapted to be supported on the support surface;
    a mounting bracket connected to said frame member, said mounting bracket including an arm having an opening;
    an electrical enclosure that is adapted to enclose an electrical component including a wire, said electrical enclosure having an opening formed therethrough, said electrical enclosure being supported on said frame member for pivoting movement about an axis defined by said opening of said mounting bracket and said opening of said electrical enclosure, said opening of said mounting bracket and said opening of said electrical enclosure forming a passageway that is adapted to allow the passage of said wire therethrough; and
    a collar surrounding said opening in said mounting bracket, said collar adapted to be at least partially disposed about said opening of said electrical enclosure.

2. A combined mounting apparatus and electrical enclosure assembly that is adapted to be supported on a support surface comprising:
    a frame member that is adapted to be supported on the support surface;
    a mounting bracket connected to said frame member, said mounting bracket including an arm having an opening;
    an electrical enclosure that is adapted to enclose an electrical component including a wire, said electrical enclosure having an opening formed therethrough, said electrical enclosure being supported on said frame member for pivoting movement about an axis defined by said opening of said mounting bracket and said opening of said electrical enclosure, said opening of said mounting bracket and said opening of said electrical enclosure forming a passageway that is adapted to allow the passage of said wire therethrough; and
    a wireway flange disposed about said opening in said mounting bracket, said wireway flange adapted to be communicably connected to a wireway system external to the assembly.

3. A combined mounting apparatus and electrical enclosure assembly that is adapted to be supported on a support surface comprising:
    a frame member that is adapted to be supported on the support surface;
    a mounting bracket connected to said frame member, said mounting bracket including an arm having an opening;
    an electrical enclosure that is adapted to enclose an electrical component including a wire, said electrical enclosure having an opening formed therethrough, said electrical enclosure being supported on said frame member for pivoting movement about an axis defined by said opening of said mounting bracket and said opening of said electrical enclosure, said opening of said mounting bracket and said opening of said electrical enclosure forming a passageway that is adapted to allow the passage of said wire therethrough; and
    a sleeve that is adapted to be received through at least one of said opening of said electrical enclosure and said opening of said mounting bracket.

4. The combined mounting apparatus and electrical enclosure assembly defined in claim 3 wherein said sleeve further defines said passageway and allows the passage of wiring therethrough.

5. The combined mounting apparatus and electrical enclosure assembly defined in claim 3 wherein said sleeve is mounted to said electrical enclosure.

6. A combined mounting apparatus and electrical enclosure assembly that is adapted to be supported on a support surface comprising:
    a frame member that is adapted to be supported on the support surface;
    a mounting bracket connected to said frame member, said mounting bracket including an arm having an opening;
    an electrical enclosure that is adapted to enclose an electrical component including a wire, said electrical enclosure having an opening formed therethrough, said electrical enclosure being supported on said frame member for pivoting movement about an axis defined by said opening of said mounting bracket and said opening of said electrical enclosure, said opening of said mounting bracket and said opening of said electrical enclosure forming a passageway that is adapted to allow the passage of said wire therethrough; and
    a second mounting bracket connected to said frame member, said second mounting bracket including an arm having an opening, said electrical enclosure having a second opening formed therethrough, said axis for pivoting movement of said electrical enclosure further defined by said second opening of said mounting bracket and said second opening of said electrical enclosure.

7. The combined mounting apparatus and electrical enclosure assembly defined in claim 6 further comprising a reinforcing base plate adapted to be mounted between said electrical enclosure and said second mounting bracket to distribute the weight of said electrical enclosure from the mounting axis to at least one of the outer edges of said electrical enclosure.

8. The combined mounting apparatus and electrical enclosure assembly defined in claim 7 further comprising a pivot member disposed within said second opening of said mounting bracket, said second opening of said electrical enclosure, and an opening in said reinforcing base plate.

9. The combined mounting apparatus and electrical enclosure assembly defined in claim 6 wherein each of said first mounting bracket and said second mounting bracket include a mounting plate to facilitate the attachment of each of said first mounting bracket and said second mounting bracket, respectively, to said frame member.

10. The combined mounting apparatus and electrical enclosure assembly defined in claim 6 wherein said opening of said second mounting bracket and said second opening of said electrical enclosure form a passageway that is adapted to allow the passage of said wire therethrough.

11. The combined mounting apparatus and electrical enclosure assembly defined in claim 6 further including a sleeve that is adapted to be received through at least one of said second opening of said electrical enclosure and said opening of said second mounting bracket.

12. The combined mounting apparatus and electrical enclosure assembly defined in claim 11 wherein said sleeve is adapted to allow the passage of wiring therethrough.

13. The combined mounting apparatus and electrical enclosure assembly defined in claim 11 wherein said sleeve is mounted to said electrical enclosure.

14. A combined mounting apparatus and electrical enclosure assembly that is adapted to be supported on a support surface comprising:
   a frame member that is adapted to be supported on the support surface;
   a mounting bracket connected to said frame member, said mounting bracket including an arm having an opening;
   an electrical enclosure that is adapted to enclose an electrical component including a wire, said electrical enclosure having an opening formed therethrough said electrical enclosure being supported on said frame member for pivoting movement about an axis defined by said opening of said mounting bracket and said opening of said electrical enclosure, said opening of said mounting bracket and said opening of said electrical enclosure forming a passageway that is adapted to allow the passage of said wire therethrough; and
   a locking mechanism for locking the position of said electrical enclosure relative to said frame member.

15. The combined mounting apparatus and electrical enclosure assembly defined in claim 14 wherein said locking mechanism is adapted to lock said electrical enclosure in a position in which the electrical enclosure is generally perpendicular to said mounting bracket.

16. The combined mounting apparatus and electrical enclosure assembly defined in claim 14 wherein said locking mechanism cooperates with said mounting bracket to lock said electrical enclosure in a position in with the electrical enclosure is generally perpendicular to said mounting bracket.

* * * * *